(No Model.)

A. F. PRICE.
BICYCLE.

No. 384,543. Patented June 12, 1888.

WITNESSES:
Th. Rollé.
A. P. Jennings.

INVENTOR:
Abel F. Price
BY Diedersheim & Fairchild
ATTORNEYS.

UNITED STATES PATENT OFFICE.

ABEL F. PRICE, OF PHILADELPHIA, PENNSYLVANIA.

BICYCLE.

SPECIFICATION forming part of Letters Patent No. 384,543, dated June 12, 1888.

Application filed October 15, 1887. Serial No. 252,441. (No model.)

*To all whom it may concern:*

Be it known that I, ABEL F. PRICE, a citizen of the United States, residing in the city and county of Philadelphia, State of Pennsylvania, have invented a new and useful Improvement in Bicycles, which improvement is fully set forth in the following specification and accompanying drawings.

My invention consists of a bicycle having a crank-shaft operated by slotted treadles or levers which serve to throw the crank past the center both in the ascending and descending motions thereof, whereby the crank is easily and powerfully rotated.

It further consists of means for adjusting the throw of the treadle or lever.

It also consists of friction-rollers forming bearings for the treadles or levers.

It finally consists of a novel means for steering the bicycle.

Figure 1:
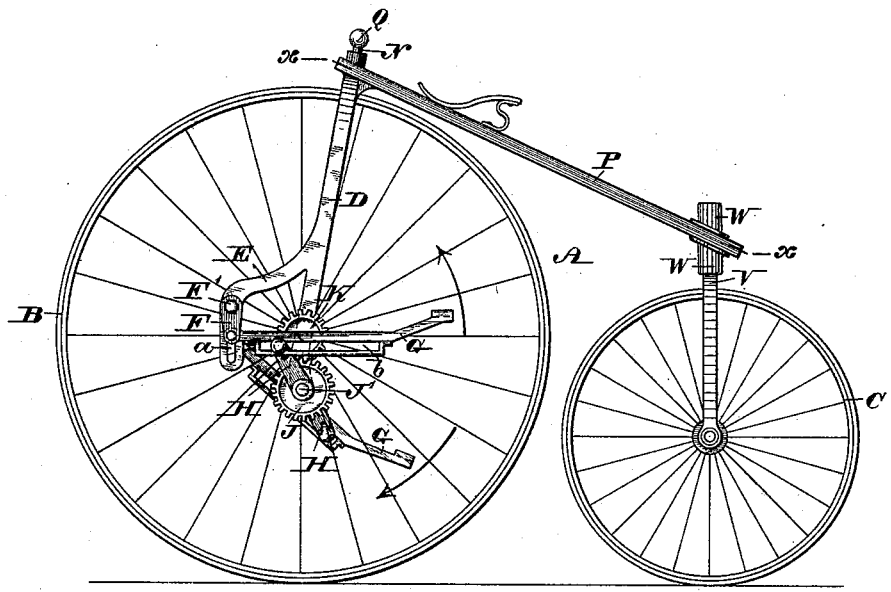
Figure 2:
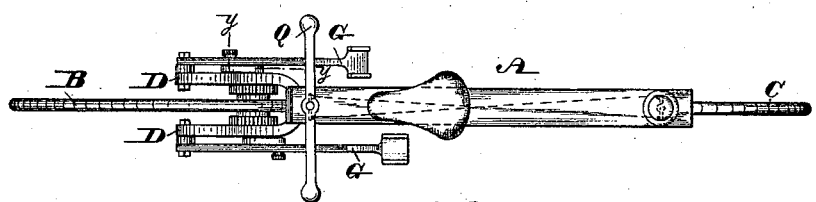
Figure 3:
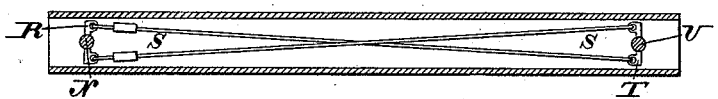
Figure 4:
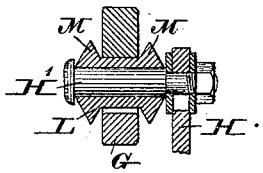
Figure 5:
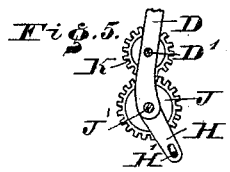

Figure 1 represents a side elevation of a bicycle embodying my invention. Fig. 2 represents a top or plan view thereof. Fig. 3 represents a horizontal section on line $x\ x$, Fig. 1, on an enlarged scale. Fig. 4 represents a vertical section of a portion on line $y\ y$, Fig. 2, on an enlarged scale. Fig. 5 represents a side view of a detached portion, partly sectional.

Similar letters of reference indicate corresponding parts in the several figures.

Referring to the drawings, A represents a bicycle having a driving-wheel, B, and a steering-wheel, C. The lower portions of the limbs of the fork D, which form the bearings of the axle or journal D' of the wheel B, have arms E secured to or cast with them, the same being vertically slotted, as at $a$, and having connected with them the links F, whose bolts F' are fitted in said slots $a$, whereby the links may be vertically adjusted. Pivoted to said links F are levers or treadles G, which are slotted in the direction of their length, as at $b$, the slots receiving the wrist-pins or outer ends of cranks H, which are secured to pinions J, whose shafts J' are mounted on the lower ends of the limbs of the fork D. Meshing with said pinions J are pinions K, which are secured to the axle or journal D' of the wheel B.

It will be seen that when the levers or treadles G are operated motion is communicated to the cranks H, and consequently to the gearing J K, whereby the axle D' is rotated and the bicycle propelled in an easy and powerful manner.

When the wrist-pins reach their centers, one of said pins being up and the other down, the pressure of the walls of the slots of the levers or treadles, respectively ascending and descending, is exerted on said pins, whereby the cranks are thrown past their center, causing an easy and powerful operation of the cranks, avoiding dwelling of the same, or irregular motions thereof, the gearing J K assisting in said operation and causing the rotation of the wheel in the proper direction.

It is evident that the bicycle may be backed by properly operating the treadles—a feature of importance in a bicycle employing levers or treadles as the motor therefor. Owing to the connection of the levers or treadles with the links F, whose attachment with the slotted arms E has been stated, the levers or treadles may be raised and lowered, as desired, for adjusting the throw thereof.

The wrist-pins or outer ends, H', of the cranks H have rollers L mounted on them, (see Fig. 4,) each of the same bearing against one of the walls of the slot $b$ of the respective lever or treadle G, whereby said pins move with ease and reduced friction in said slot, this being further assisted by making the outer faces of the pulley and inner faces of the grooves thereof of conical form; or, in other words, the pulley has a doubly-conical head, M, at each end, whereby the least possible surfaces are presented, respectively, to the crank H, the nut or washer on the wrist-pin, and lever or treadle G, thus reducing friction between said parts.

In order to steer the bicycle, the journal N, which is mounted in the reach or backbone P and carries the tiller or handle Q, has secured to it an arm, R, with which are attached cross-rods S, which pass through said reach, and are also secured to an arm, T, attached to the journal U of the fork V of the steering-wheel C, said journal being mounted in bosses W W, and connected with the reach and extending, respectively, above and below the same, thus forming extended bearings for said journal U, and consequently firmly sustaining the same, it being noticed that the reach is hollow or partly hollow and conceals the arms R T and cross-rods S.

Having thus described my invention, what I claim as new, and desire to secure by Letters Patent, is—

1. In a bicycle, a treadle, in combination with a lever or arm having a wrist-pin or stud, and a gear-wheel meshing with a pinion on the shaft of the driving-wheel of the bicycle, the said treadle bearing on said wrist-pin or stud, substantially as and for the purpose set forth.

2. In a bicycle, the fork D, having slotted arms E, in combination with link F, the treadle G, pivoted to said link, the wheel J, having the arm H, and the pinion K, mounted on the axle of the driving-wheel B, the said treadle bearing on and operating the said arm H, substantially as and for the purpose set forth.

3. In a bicycle, a slotted lever or treadle engaging with the crank thereof, in combination with a friction-roller of conical form mounted on said crank, substantially as described.

4. In a bicycle, a slotted lever engaging with the crank thereof and vertically adjustable on the frame of the bicycle, substantially as described.

5. In a bicycle, the fork having a slotted arm, in combination with a link vertically adjustable in said slotted arm and a treadle pivoted to said link, substantially as and for the purpose set forth.

6. In a bicycle, a roller having beveled ends, in combination with a treadle and an arm connected to gearing meshing with and operating a pinion on the driving-wheel, substantially as and for the purpose described.

ABEL F. PRICE.

Witnesses:
JOHN A. WIEDERSHEIM,
JAMES F. KELLY.